United States Patent Office 3,163,581
Patented Dec. 29, 1964

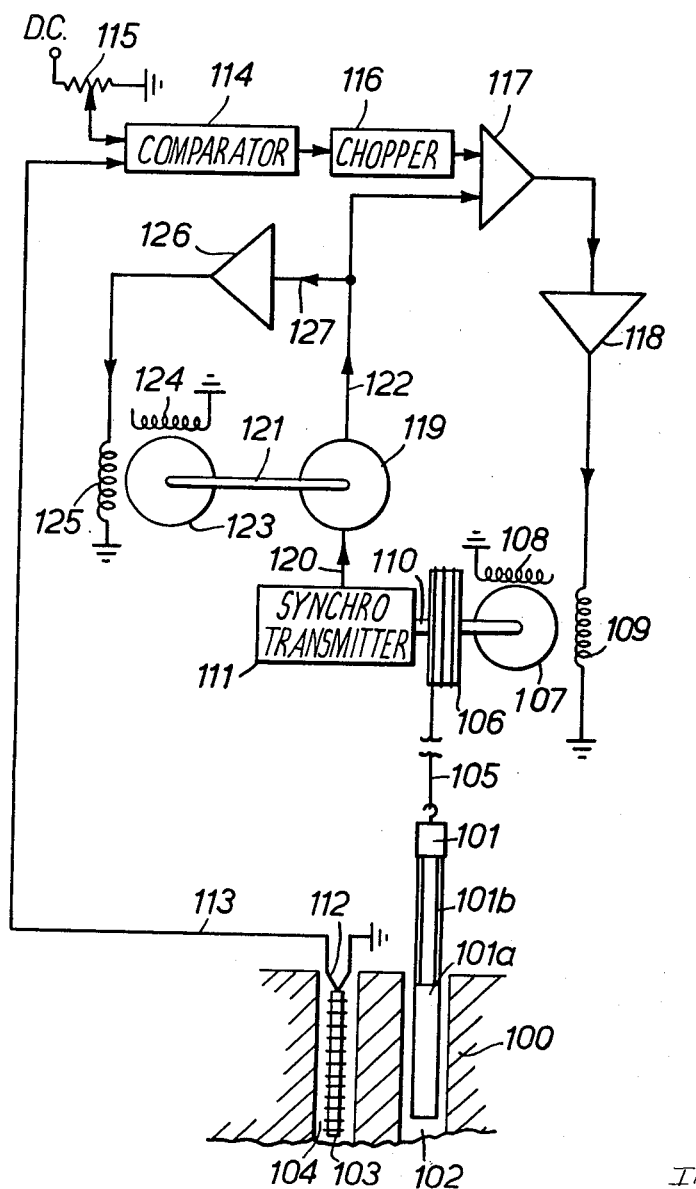

3,163,581
APPARATUS FOR TRIMMING THE POSITION OF A CONTROL ROD
Ronald Hugh Campbell, Hale, England, assignor to United Kingdom Atomic Energy Authority, London, England
Filed Nov. 1, 1960, Ser. No. 66,483
Claims priority, application Great Britain Nov. 9, 1959
1 Claim. (Cl. 176—24)

This invention relates to automatic control systems and is described below in its application to the automatic control of nuclear reactors.

It is common practice in the stabilization of automatic control systems to introduce the feature of "phase advance" (sometimes referred to as "phase lead" or "proportional plus derivative"), this feature being obtained from a passive network of resistors and capacitors. However, where the frequency of operation of the control system is low the capacitors have to be of a large size and this can impose practical limitations.

In the high power nuclear reactor field (see for example "Nuclear Power," vol. 5, No. 52, page 74, and No. 51, page 68) automatic control has generally only been adopted in order to avoid manual complexity but, with higher burn-up of nuclear fuel to be expected in the future, automatic control with phase advance will be required in order to provide a speed of response which cannot be provided adequately by manual operation. However, the frequency to be expected in a nuclear reactor automatic control system is extremely low (typically $\frac{1}{100}$ of a radian per second) and passive phase advance networks are not suitable for the reason referred to above.

The present invention provides, in an automatic control system, an electro-mechanical phase advance system which can operate reliably at low frequencies and this is achieved by the utilization of an auxiliary servo element which is compared in position with a control element, the difference being fed both as a feed back to the input of the control system and as the resetting signal to the auxiliary servo, the auxiliary servo moving at a slower rate than the control element.

The invention will now be further illustrated with reference to the accompanying drawing which is a circuit arrangement.

There is shown diagrammatically in the drawing a part of a graphite core structure 100 of a gas-cooled nuclear reactor, the structure 100 having a control rod 101 movable in a channel 102 and a fuel element 103 located in a fuel element channel 104. The control rod is suspended on a cable 105 from a winch 106 driven by a two phase, control rod operating motor 107 having a reference phase winding 108 and a control phase winding 109. The winch has a shaft 110 extended to drive a control element in the form of a synchro transmitter 111 that is, an element giving an output voltage which uniquely defines the angular position of its shaft to generate a feedback signal. The fuel element 103 is equipped with a temperature measuring device in the form of a thermocouple 112 having a connection 113 to the control circuit described below to control the motor 107 in a manner such that the control rod is moved in a sense tending to keep the fuel element temperature constant, that is, as the fuel temperature rises (suggestive of power of the reactor rising if the coolant mass flow and inlet temperature is constant) then the control rod moves into the reactor to reduce reactivity. The control rod is one of a group known as the "fine" rod group. Typically three such rods are provided in the group distributed symmetrically in the reactor core. These rods may each absorb ¼% reactivity and have, in combination, a control speed range up to a maximum of about $10^{-5}$ in $k$ per second. They are made of two thicknesses of stainless steel absorber, the lower half 101a being of half the cross section of the upper half 101b so that a substantial linear change in reactivity absorption is obtained with movement of the rod, so keeping the control system gain constant. The automatic "fine" control rods are assisted by twelve manually operated control rods each absorbing 0.75% reactivity giving a main control reactivity of 9%.

The connection 113 from the thermocouple 112 leads to a comparator 114 where the thermocouple is compared with a reference D.C. potential derived from a potentiometer 115. The D.C. output from the comparator 114 passes to a chopper 116, the A.C. output of which connects with a pre-amplifier 117, the output of which functions as an input control signal to drive a power amplifier 118 connected to the control phase 109 of the motor 107. Now the transmitter 111 is connected to the input of a synchro control transformer 119, that is, an element which gives an electrical output related to the difference in position between an electrical input and a shaft input by a connection 120, the transformer 119 being driven by an input shaft 121 and provided with an electrical output 122 which is a feedback signal to the amplifier 117. The shaft 121 is connected with a two-phase motor 123 (to be identified as exemplifying the auxiliary servo element referred to above) having a reference phase 124 and a control phase 125. The motor 123 is controlled from an amplifier 126 having its input connection 127 joined with the output 122. The output 122 is connected to a second input of the amplifier 117.

Operation of the circuit referred to above will now be described. Assume an output arises from the comparator 114 (such as may arise from a change at thermocouple 112 or by a change introduced at potentiometer 115). The motor 107 moves to provide at least two effects: in the first place it rotates the winch 106 to adjust the position of the control rod in a direction to reduce the output from the comparator 114 and in the second place it rotates the synchro transmitter 111 to give an output voltage in connection 120. The voltage 120 can be regarded as a change of one input position to the control transformer 119 and hence a feed-back voltage appears in connection 122. The voltage in connection 122 energizes coil 125 of motor 123 so that the shaft 121 is rotated. This represents a change in the other input position to the control transformer 119 to reduce the difference in the input positions and hence reduce the feed back voltage in connection 122.

The gain (that is positional change for a given voltage input) of the loop including amplifiers 117 and 118 typically shows itself as a positional change of motor 107 of $2 \times 10^{-5}$ in $k$ per second per ° C. temperature error at comparator 114. The gain of the loop including 126, which is, in effect, a second feedback loop, is typically ten times lower than the gain of the loop including amplifiers 117 and 118. The amount of phase advance obtained is dependent upon the relative gains in the two loops.

The principal advantage of the circuit arrangement described is, as stated above, the provision of an automatic control system with electro-mechanical phase advance that avoids the use of large capacitors, high impedance circuits and D.C. amplifiers. With the avoidance of a passive network, noise in the input is amplified to a smaller extent whilst large changes in forward gain have litle effect on the performance of the apparatus. As large changes in forward gain can be tolerated the motor 107 can be of a squirrel-cage induction type. This, of course, obviates the need of the expensive and rather complicated frequency converting equipment usually associated with reactor control.

It is suggested that as the reactivity controlled by the apparatus is small (as the apparatus is designed to operate on only three fine rods for example) the rods themselves should be devoted solely to automatic trimming control and not be complicated with trip mechanisms allowing them to function as shut-off rods.

I claim:

Apparatus for effecting automatic trimming control in a gas-cooled nuclear reactor and in combination with such a reactor comprising a reactor fuel temperature measuring device, comparator means for comparing the output of said temperature measuring device with a reference quantity to produce an input control signal, a control rod, a reactor control rod operating motor responsive to said input control signal to move the control rod in a direction to reduce said control signal, a first feedback loop comprising a generator to generate a first feedback signal responsive to the energization of said control rod operating motor and applied by said first loop from said control rod operating motor to a point of application of said input control signal to the reactor control rod operating motor, and a second feedback loop completed from said point of application of said first feedback signal to said generator to thereby reduce said first feedback signal toward zero at a rate slower than the rate of response of said control rod to said input control signal.

References Cited in the file of this patent

UNITED STATES PATENTS

| | | |
|---|---|---|
| 2,367,746 | Williams | Jan. 23, 1945 |
| 2,664,530 | Young | Dec. 29, 1953 |
| 2,931,761 | Hurwitz | Apr. 5, 1960 |
| 2,990,353 | Howard et al. | June 27, 1961 |

OTHER REFERENCES

Schultz: "Control of Nucl. Reactors and Power Plants," March 6, 1961, publ. by McGraw-Hill, page 226.